US010389950B2

(12) United States Patent
Kosaka (10) Patent No.: US 10,389,950 B2
(45) Date of Patent: Aug. 20, 2019

(54) EXPOSURE CONTROL APPARATUS THAT CONTROLS EXPOSURE DURING SHOOTING AND DETECTS A REGION OF AN IMAGE, CONTROL METHOD THEREFOR, STORAGE MEDIUM, AND IMAGE PICKUP APPARATUS (71) Applicant: CANON KABUSHIKI KAISHA, Tokyo (JP)

(72) Inventor: Takashi Kosaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 14/990,870

(22) Filed: Jan. 8, 2016

(65) Prior Publication Data
US 2016/0205307 A1    Jul. 14, 2016

(30) Foreign Application Priority Data

Jan. 9, 2015   (JP) ................................. 2015-002922

(51) Int. Cl.
*H04N 5/235*       (2006.01)
*G06K 9/00*        (2006.01)
(Continued)

(52) U.S. Cl.
CPC ....... *H04N 5/2353* (2013.01); *G06K 9/00255* (2013.01); *G06T 5/50* (2013.01);
(Continued)

(58) Field of Classification Search
CPC .... H04N 5/235–5/243; H04N 5/23219; H04N 21/4223; H04N 21/44218;
(Continued)

(56) References Cited

U.S. PATENT DOCUMENTS

2003/0071908 A1* 4/2003 Sannoh ............. H04N 5/23212
                                                 348/345
2007/0160359 A1* 7/2007 Imamura ............... G02B 7/102
                                                 396/238
(Continued)

FOREIGN PATENT DOCUMENTS

JP           2010041399 A      2/2010

*Primary Examiner* — Sinh Tran
*Assistant Examiner* — Selam T Gebriel
(74) *Attorney, Agent, or Firm* — Rossi, Kimms & McDowell LLP (57) ABSTRACT An exposure control apparatus prevents exposure from being influenced by false detection and instability of face detection and prevents exposure from being influenced by an object that has cut across in front of a subject. Detection results are obtained by detecting at least one specific region, which is predetermined in advance, in a taken image of the subject. When at least one specific region is detected, one of detection results is selected based on selecting conditions determined in advance to obtain a selected detection result. When it is judged that exposure is not being controlled using the selected detection result, whether or not the selected detection result has changed in a predetermined period is judged. When the selected detection result has not changed, a latest detection result is regarded as the selected detection result, and when the selected detection result has changed, the selected detection result is not changed.

14 Claims, 7 Drawing Sheets (51) Int. Cl.
*G06T 5/50* (2006.01)
*G06T 7/20* (2017.01)
*H04N 5/232* (2006.01)

(52) U.S. Cl.
CPC ............. *G06T 7/20* (2013.01); *H04N 5/2351* (2013.01); *H04N 5/23219* (2013.01); *G06T 2207/10144* (2013.01); *H04N 5/23245* (2013.01)

(58) Field of Classification Search
CPC ...... G03B 7/00–7/28; G03B 9/58–9/62; G03B 2207/00–2207/005; G06K 9/00221–9/00389; G06T 2207/30196–2207/0201; G06F 17/30793
See application file for complete search history.

(56) References Cited

U.S. PATENT DOCUMENTS

| | | | |
|---|---|---|---|
| 2007/0196097 A1* | 8/2007 | Sugimoto | G03B 7/08 396/234 |
| 2007/0223908 A1* | 9/2007 | Sakamoto | H04N 5/2351 396/234 |
| 2012/0262599 A1* | 10/2012 | Brunner | H04N 5/23216 348/222.1 |

* cited by examiner

EXPOSURE CONTROL APPARATUS THAT CONTROLS EXPOSURE DURING SHOOTING AND DETECTS A REGION OF AN IMAGE, CONTROL METHOD THEREFOR, STORAGE MEDIUM, AND IMAGE PICKUP APPARATUS

BACKGROUND OF THE INVENTION

Field of the Invention

The present invention relates to an exposure control apparatus, a control method therefor, a storage medium, and an image pickup apparatus, and in particular to control of exposure when taking moving images.

Description of the Related Art

In general, when a still image is taken using an image pickup apparatus such as a digital camera, a shooting screen is divided into a plurality of areas to perform photometry. Then, evaluative photometry which divides a shooting screen into a plurality of areas and determines exposure according to a balance between light areas and dark areas in the plurality of areas, spot photometry which measures only a predetermined small area, or the like is performed. In any of these photometric modes, to determine areas to be measured or determine weights for split areas, positional information on a focus detection area that is to be brought into focus is used.

On the other hand, in photometry performed when moving images are taken, exposure is controlled with importance put on exposure stability as for movement of a subject and changing of a composition. Accordingly, some image pickup apparatuses have, as its dedicated photometric mode, center-weighted average photometry which averagely measures a relatively wide range with a weight put on a central part of a screen.

Further, in recent years, a method that detects a person's face from a taken image and tracks the same has been used for image pickup apparatuses. Also, there is an image pickup apparatus which, in a case where a person's face is detected when taking moving images, provides control to switch the photometric mode from center-weighted average photometry to face evaluative photometry with a weight given to split areas (photometric split zones) of a face portion.

In this image pickup apparatus, when no person's face is detected, exposure is controlled using center-weighted average photometry. In this case, for example, in a composition with a central part of a screen being bright and a slightly-backlit person lying at an edge of the screen, correct exposure is obtained with blown-out highlights suppressed in the central part of the screen, whereas exposure for a face of the person is somewhat dark.

In addition, when a state in which whether or not it is possible to detect a face of a person is not certain continues, that is, a state in which face detection is possible and a state in which face detection is impossible occur alternately, the image pickup apparatus described above intermittently switches between face evaluative photometry and center-weighted average photometry. As a result, exposure intermittently changes, causing the brightness of moving images to instability.

There is known an image pickup apparatus which to prevent the above described switching of photometric modes, performs processing to cope with chattering of face detection results, that is, refers to a plurality of face detection results to determine a photometric mode (see Japanese Laid-Open Patent Publication (Kokai) No. 2010-41399).

However, trying to prevent instability of face detection results by performing processing to cope with chattering presents a problem described below.

When an object cuts across a screen during taking of moving images in a composition with a person in the screen, there is a delay from when the object starts to cut across in front of the person to when a judgment result indicative of face detection impossible is obtained because a plurality of face detection results are referred to. For this reason, from when the object starts to cut across in front of the person to when a judgment result indicative of face detection impossible is obtained, face evaluative photometry is performed with a brightness of the object, which has cut across in front of the person, regarded as a brightness of the person's face, and exposure control is influenced by the object.

For example, when an object that has cut across a screen is black, a face that has been correctly exposed may be temporarily overexposed to cause instability of exposure. Particularly in a shooting scene with two persons, a black object cutting across a main subject (main face) leads to incorrect exposure for the other subject.

SUMMARY OF THE INVENTION

The present invention provides an exposure control apparatus and a control method therefor, which are capable of preventing exposure from being influenced by false detection and instability of face detection and also preventing exposure from being influenced by an object that has cut across in front of a subject, as well as a storage medium and an image pickup apparatus.

Accordingly, the present invention provides an exposure control apparatus that controls exposure in taking an image of a subject, comprising a detection unit configured to obtain detection results by detecting at least one specific region, which is predetermined in advance, in an image obtained by taking an image of the subject, a selection unit configured to, when at least one specific region is detected by said detection unit, select one of the detection results based on selecting conditions determined in advance to obtain a selected detection result, a first judgment unit configured to judge whether exposure is being controlled using the selected detection result, and a second judgment unit configured to, when said first judgment unit judges that exposure is not being controlled using the selected detection result, judge whether the selected detection result has changed in a predetermined period, wherein when said second judgment unit judges that the selected detection result has not changed, said selection unit regards a latest detection result obtained by said detection unit as the selected detection result, and when said second judgment unit judges that the selected detection result has changed, said selection unit does not change the selected detection result.

According to the present invention, exposure is prevented from being influenced by false detection and instability when a specific region such as a face region is detected, and exposure is prevented from being influenced by an object that has cut across in front of a subject.

Further features of the present invention will become apparent from the following description of exemplary embodiments (with reference to the attached drawings).

BRIEF DESCRIPTION OF THE DRAWINGS

FIGS. 1A and 1B are views useful in explaining an example of moving image taking using a conventional image pickup apparatus, in which

FIGS. 2A and 2B are views useful in explaining another example of moving image taking using the conventional image pickup apparatus, in which

FIGS. 7A and 7B are views useful in explaining a face list stored in a camera microcomputer in FIGS. 1A and 1B, in which

DESCRIPTION OF THE EMBODIMENTS

Hereafter, an exemplary image pickup apparatus according to an embodiment of the present invention will be described with reference to the drawings.

Here, before the image pickup apparatus according to the embodiment of the present invention is described, a description is given first of how exposure is controlled when moving images are taken using a conventional image pickup apparatus.

Figure 1A:
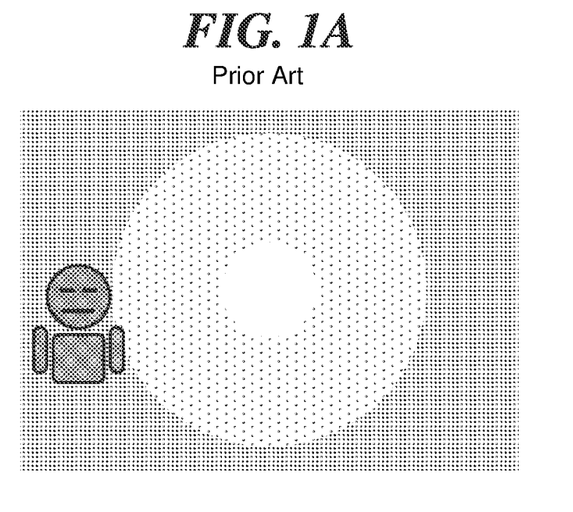
FIG. 1A is a view showing an image in a state where a face has been detected.
Figure 1B:
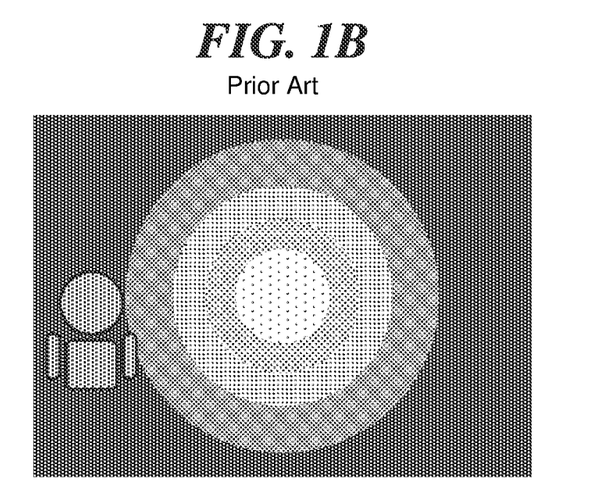
FIG. 1B is a view showing an image in a state where no face has been detected.

FIGS. 1A and 1B are views useful in explaining an example of moving image taking using the conventional image pickup apparatus. FIG. 1A is a view showing an image in a state where a face has been detected, and FIG. 1B is a view showing an image in a state where no face has been detected.

Now assume that as shown in FIG. 1A, a moving images of a composition in which a central part of a screen is bright, and a person who is a little backlit lies at an edge of the screen are taken. Here, when the image pickup apparatus correctly detects a face of the person (specific area), the image pickup apparatus controls exposure using evaluative photometry described earlier. As a result, the backlit state of the person's face is got rid of to obtain moving images with correct exposure for the face portion.

On the other hand, when no face in the image has been detected due to the face portion being dark, the face portion being small, or no characteristic points of the face being extracted because of a face orientation, the image pickup apparatus controls exposure using center-weighted average photometry. As a result, correct exposure is obtained with no blown-out highlights in a high-luminance area in a central part of the screen, whereas the face portion of the person is underexposed (see FIG. 1B).

Further, when a state in which the person's face cannot be detected occurs intermittently, the image pickup apparatus intermittently switches between evaluative photometry and center-weighted average photometry to control exposure.

When the photometric mode is thus changed intermittently, exposure repeatedly changes, causing the brightness of moving images to instability.

There is an image pickup apparatus which performs processing to cope with chattering of face detection results in order to prevent such instability of the brightness of moving images. This image pickup apparatus determines the way of photometry by referring to a plurality of detection results.

Figure 2A:
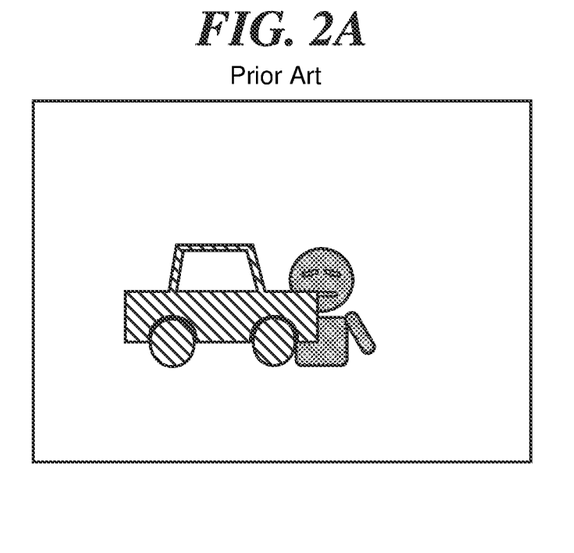
FIG. 2A is a view showing a state where an object has cut across in front of a person when there is only one person.
Figure 2B:
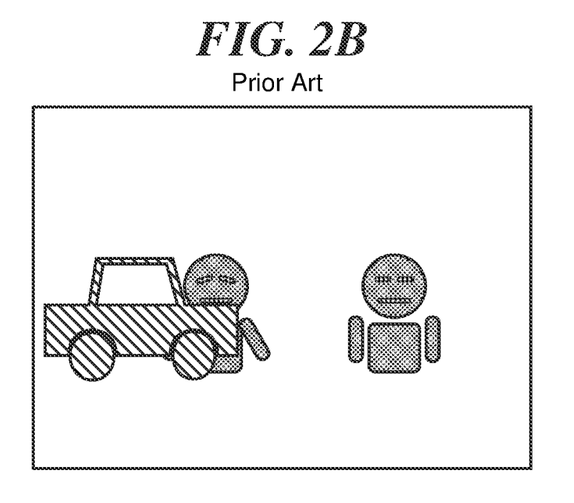
FIG. 2B is a view showing a state where an object has cut across in front of a person when there are two persons.

FIGS. 2A and 2B are views useful in explaining another example of moving image taking using the conventional image pickup apparatus. FIG. 2A is a view showing a state in which an object has cut across in front of a person when there is only one person, and FIG. 2B is a view showing a state in which an object has cut across in front of a person when there are two persons.

Assume that as shown in FIG. 2A, while moving images are taken with a composition in which there is one person in a screen, an object (here, a car) cuts across the screen. Since the image pickup apparatus determines the way of photometry based on a plurality of face detection results, determination as to the way of photometry is delayed. As a result, a phenomenon in which exposure control is influenced by the object occurs.

When the object is black, moving images with correct exposure for a face are temporarily overexposed to cause exposure instability. Particularly as shown in FIG. 2B, in a composition with two persons, the black object cutting across in front of a main subject (a person on the left-hand side in the figure) leads to incorrect exposure for the other subject (a person on the right-hand side in the figure).

Figure 3:
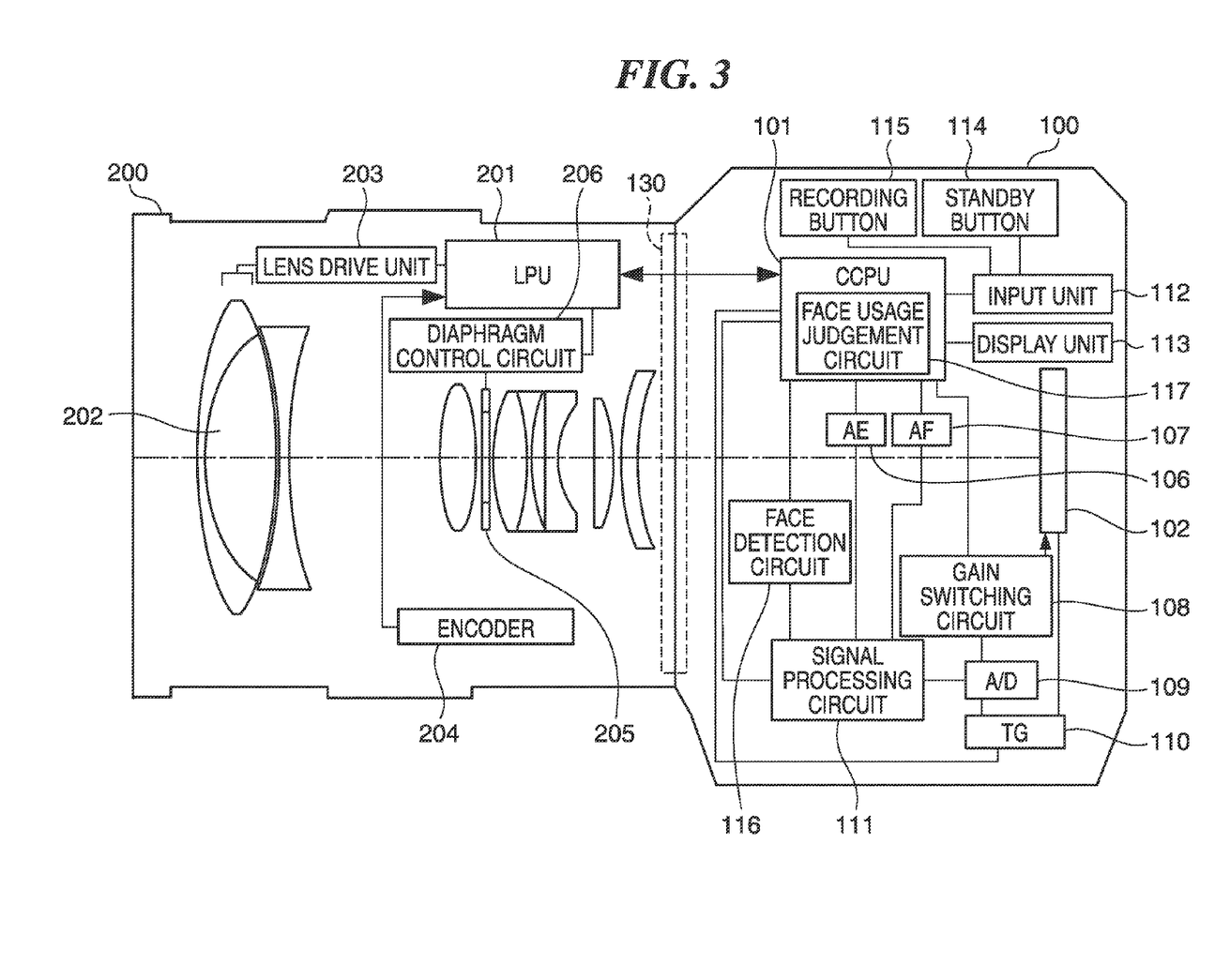
FIG. 3 is a diagram schematically showing an exemplary image pickup apparatus according to an embodiment of the present invention.

FIG. 3 is a diagram schematically showing an arrangement of an exemplary image pickup apparatus according to the embodiment of the present invention.

The image pickup apparatus shown in the figure is, for example, a digital camera (hereafter referred to as the camera) and has a camera main body 100 and a lens unit 200 with interchangeable lenses.

The camera main body 100 has a microcomputer (CCPU: hereafter referred to as the camera microcomputer) 101, and the camera microcomputer 101 is responsible for controlling the entire camera. In the camera main body 100, an image pickup device 102 such as a CCD or CMOS image sensor is disposed on an optical axis (optical path) of the lens unit 200. The image pickup device 102 is equipped with an infrared cut-off filter and a low-pass filter although they are not shown in the figure. A subject image (optical image) is formed on the image pickup device 102 through the lens unit 200, and the image pickup device 102 outputs an image signal (analog signal) corresponding to the optical image.

The image signal output from the image pickup device 102 is converted into a digital image signal by an A/D converter (A/D) 109. The digital image signal is then sent to a signal processing circuit 111. The signal processing circuit 111 subjects the digital image signal to image processing based on predetermined parameters to generate image data.

A photometry circuit (AE) 106 provides photometric control, to be described later, in accordance with the image data output from the signal processing circuit 111. A focus detection circuit (AF) 107 provides focus detection control, to be described later, based on image data.

A gain switching circuit 108 is for switching gains of the image pickup device 102, and switching of gains using the gain switching circuit 108 is controlled by the camera microcomputer 101 in accordance with shooting conditions, input by a photographer, and so on.

A timing generator (TG) 110 synchronizes input of an image signal, which is output from the image pickup device 102, and the timing of A/D conversion using the A/D converter 109 under the control of the camera microcomputer 101. It should be noted that description of memory for storing image data obtained as a result of signal processing performed by the signal processing circuit 111 is omitted here.

A lens mount 130 is an interface to a lens microcomputer 201, to be described later, and has a communication terminal for carrying out data communications between the lens microcomputer 201 and the camera microcomputer 101. The data communications make it possible to determine a type and status of the lens unit 200, which is mounted on the camera main body 100.

An input unit 112 has, for example, a shooting standby button (standby button) 114, which brings the camera into a shooting standby state, and a recording start button (recording button) 115. The input unit 112 also has switches and buttons for switching between an AF area arbitrary selecting mode and a multipoint/face tracking mode, a shooting mode switching dial for switching between a shutter speed priority mode and an aperture priority mode. A user inputs, for example, settings of the camera through the input unit 112.

A display unit 113 has a liquid crystal device, a light-emitting element, and so forth, and displays a set mode, other information on shooting, and so forth. A face detection circuit 116 detects a person's face (face region: specific region) in image data, which is output from the signal processing circuit 111, and sends the face region detection result to the camera microcomputer 101. The number of face regions in image data, positions and sizes of the respective face regions in the image data, orientations of the face regions, and so forth are identified by the face detection circuit 116.

To detect a face region, for example, a method that extracts characteristic parts of a face such as eyes, nose, and mouth in image data is used. Further, skin color data may be extracted from image data, and a region judged as being a skin color range may be detected as a face region. Also, with focus on a contour of a face region, oval shape information indicative of the contour may be used to detect a face region.

As shown in the figure, the camera microcomputer 101 is equipped with a face usage judgment circuit 117, which judges whether or not to use a face region detection result in determining exposure as will be described later. A judgment result (face usage judgment result) obtained by the face usage judgment circuit 117 is used for photometric control by the photometry circuit 106.

The lens unit 200 is equipped with the microcomputer (LPU: lens microcomputer) 201, which controls the operation of the lens unit 200. Namely, the lens microcomputer 201 controls the lens unit 200 and makes judgments on various conditions.

The lens unit 200 has a lens group 202 with a plurality of lenses. The lens group 202 includes a focus lens that is disposed so as to be movable along the optical axis and adjusts focus.

A lens drive unit 203 is an actuator for moving an optical system for focus detection and focal alignment in the lens group 202. Based on a focus detection result obtained by the focus detection circuit 107, the camera microcomputer 101 finds the control amount of the lens drive unit 202, that is, the amount by which the lens group 202 is actuated (the amount of lens actuation).

The camera microcomputer 101 sends the calculated amount of lens actuation to the lens microcomputer 201. On the other hand, the position of the lens group 202 is detected by an encoder 204 and sent as lens positional information to the lens microcomputer 201.

The lens microcomputer 201 moves the lens group 202 to a focusing position by controlling the lens drive unit 203 according to the amount of lens actuation while referring to the lens positional information. It should be noted that during focus detection, focus detection information indicative of the direction in which the lens group 202 is actuated and the speed at which the lens group 202 is actuated is sent from the camera microcomputer 101 to the lens microcomputer 201. The lens microcomputer 201 then moves the lens group 202 along the optical axis by controlling the lens drive unit 203 according to the focus detection information.

A diaphragm 205 is for adjusting the amount of light incident on the camera main body 100. A diaphragm control circuit 206 drivingly controls the diaphragm 205 under the control of the lens microcomputer 201. The amount of diaphragm actuation required to control the diaphragm 205 is sent from the camera microcomputer 101 to the lens microcomputer 201. It should be noted that the focal length of the lens group 202 may be a single focal point and also may be variable like a zoom lens.

Figure 4:
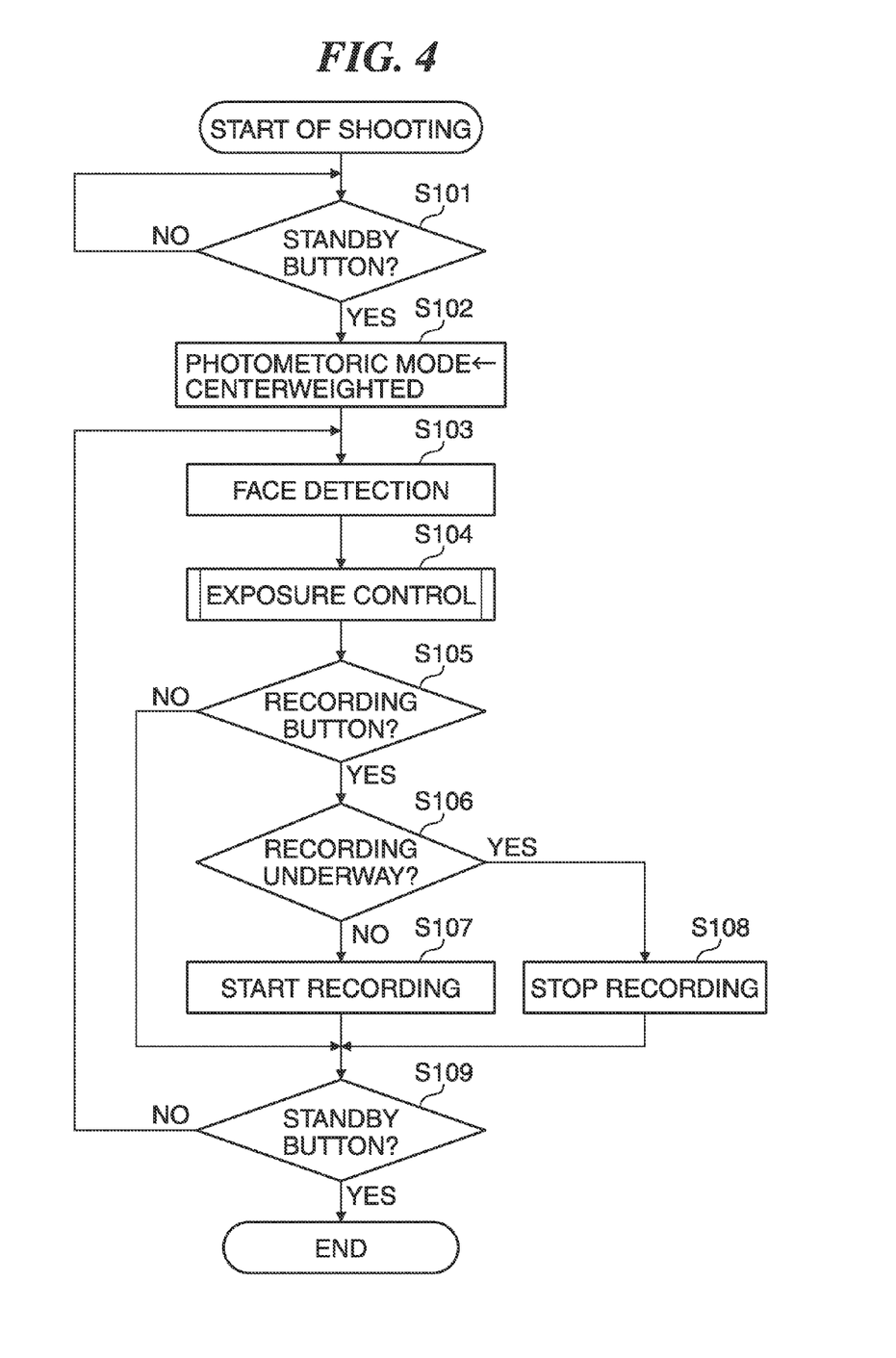
FIG. 4 is a flowchart useful in explaining a shooting operation which is performed by a camera in FIG. 3.

FIG. 4 is a flowchart useful in explaining a shooting operation which is performed by the camera in FIG. 3.

When the shooting operation is started, first, the camera microcomputer 101 judges whether or not the shooting standby button 114 has been operated (step S101). When the shooting standby button 114 has not been operated, that is, when the shooting standby button 114 has not been depressed (NO in the step S101), the camera microcomputer 101 stands by.

On the other hand, when the shooting standby button 114 has been operated (YES in the step S101), the camera microcomputer 101 selects center-weighted average photometry (centerweighted) as the way of photometry (photometric mode) for first exposure control (step S102). It should be noted that as described earlier, in center-weighted average photometry, a relatively wide range is averagely metered with a weight given to a central part of a screen.

Next, the camera microcomputer 101 detects a face in image data using the face detection circuit 116 (step S103). Then, in accordance with a face region detection result obtained as a result of the face detection by the face detection circuit 116, the camera microcomputer 101 identifies and stores the number of face regions, positions and sizes of the respective face regions in the image data, face orientation, and so forth.

After that, the camera microcomputer 101 controls exposure as will be described later (step S104). The camera microcomputer 101 then judges whether or not the recording start button 115 has been operated (step S105). When the recording start button 115 has been operated (YES in the step S105), the camera microcomputer 101 judges whether or not recording is underway (step S106).

When recording is not underway (NO in the step S106), the camera microcomputer 101 controls the camera to start recording (step S107). On the other hand, when recording is underway (YES in the step S106), the camera microcomputer 101 stops recording (step S108).

After the process in the step S107 or S108, the camera microcomputer 101 judges whether or not the shooting standby button 114 has been operated (step S109). When the shooting standby button 114 has been operated (YES in the step S109), the camera microcomputer 101 stops shooting (step S106).

On the other hand, when the camera microcomputer 101 judges that the shooting standby button 114 has not been operated (NO in the step S109), the process returns to the step S103. It should be noted that when the camera microcomputer 101 judges that the recording start button 115 has not been operated (NO in the step S105), the process proceeds to the step S109.

Figure 5:
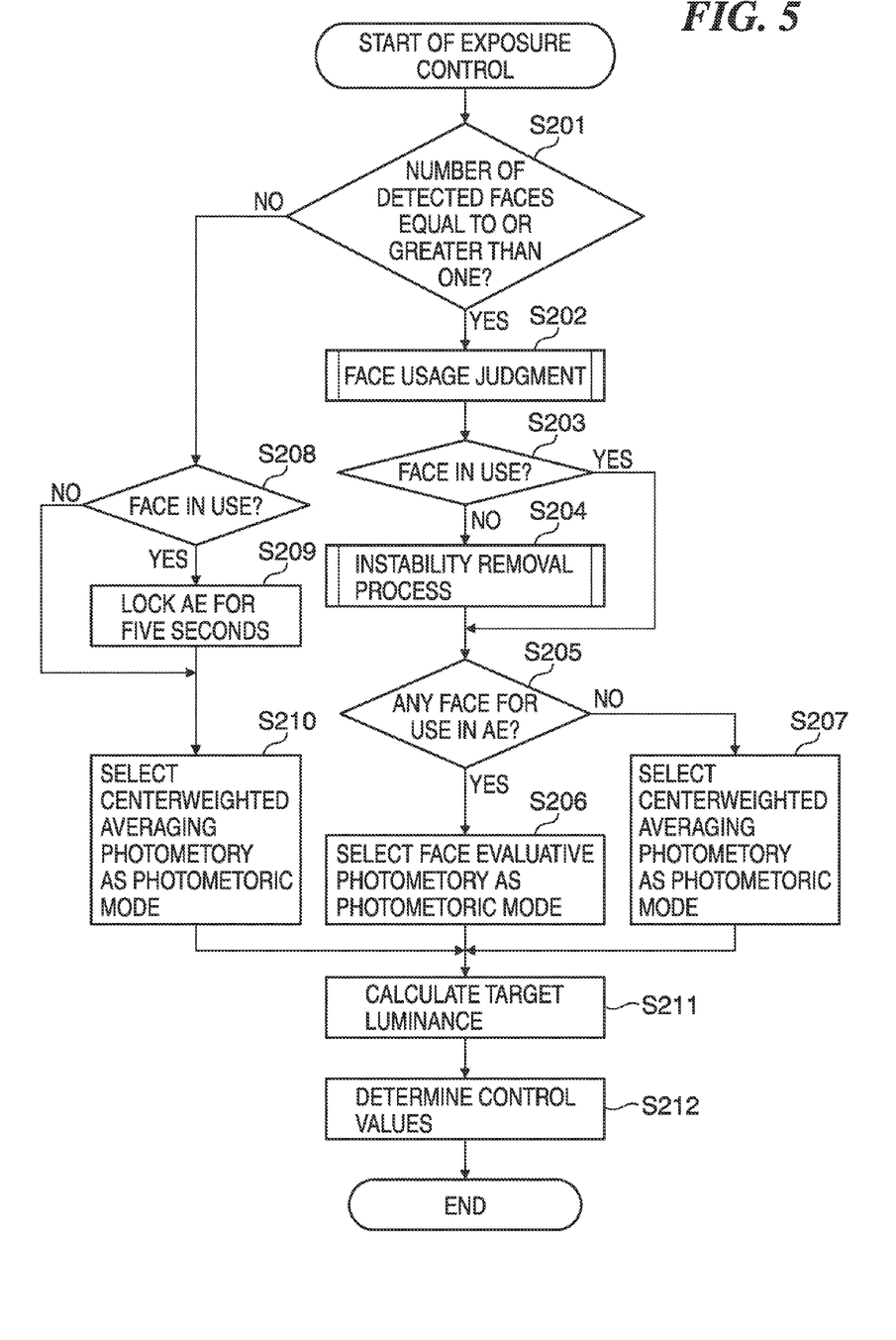
FIG. 5 is a flowchart useful in explaining exposure control in FIG. 4.

FIG. 5 is a flowchart useful in explaining exposure control in FIG. 4.

When exposure control is started, the camera microcomputer 101 refers to a face detection result obtained by the face detection circuit 116 and judges whether or not the number of detected face regions is equal to or greater than one (step S201). When the number of detected face regions is equal to or greater than one, that is, when there is any face region in image data (YES in the step S201), the camera microcomputer 101 judges whether or not there is any face region for use in exposure control among the face regions detected by the face usage judgment circuit 117 and ranks priorities as will be described later (step S202).

The camera microcomputer 101 then judges whether or not the face region detection result is being used in the present exposure control (step S203). When the face region detection result is not being used in the present exposure control (NO in the step S203), that is, when a face region for use in exposure control is newly detected in the state where the face region detection result is not being used in the present exposure control, the camera microcomputer 101 carries out an instability removal process for the face usage judgment result as will be described later (step S204).

The camera microcomputer 101 determines whether or not there is any face region for use in new exposure control (AE) according to the face usage judgment result or the face usage judgment result after the instability removal process (step S205). It should be noted that when the camera microcomputer 101 determines that the face region detection result being used in the present exposure control (YES in the step S203), the process proceeds to the step S205.

When there is any face region for use in new exposure control (YES in the step S205), the camera microcomputer 101 selects evaluative photometry as the photometric mode (step S206). On the other hand, when there is no face region for use in new exposure control (NO in the step S205), the camera microcomputer 101 selects center-weighted average photometry as the photometric mode (step S207).

As a result, even when a face region is newly detected in the state where exposure is being controlled without using face regions, exposure control is continued without immediately using face regions for exposure control if face region detection results are not stably output. Here, center-weighted average photometry is continuously used as the photometric mode.

When no face region is detected in the image data (NO in the step S201), the camera microcomputer 101 judges whether or not a face region detection result is being used for the present exposure control (step S208). When a face region detection result is being used in the present exposure control (YES in the step S208), the camera microcomputer 101 determines that a person's face has disappeared and fixes (locks) an exposure control value for a predetermined time period (AE lock: step S209). Namely, when a face region for use in exposure control has disappeared in the state where a face region detection result is being used for the present exposure control, the camera microcomputer 101 locks AE for a predetermined time period.

This predetermined time period is, for example, five seconds, and in AE lock, update of a photometric result that is a target value for exposure control, that is, a subject luminance is stopped in AE lock.

It should be noted that the way of fixing exposure is not particularly limited, but update of a photometric result may be updated, and control values for use in exposure control, for example, TV (shutter speed), AV (aperture value), and ISO sensitivity may be fixed.

The camera microcomputer 101 then selects center-weighted average photometry as the photometric mode (step S210). It should be noted that when the camera microcomputer 101 determines that no face region detection result is being used in the present exposure control (NO in the step S208), the process proceeds to the step S210.

It should be noted that when AE is locked in the step S209, the photometric mode is switched from evaluative photometry to center-weighted average photometry, but exposure in the image does not immediately change. When a person's face region is detected again during AE lock and allowed to be used for exposure control, the photometric mode is returned to evaluative photometry. As a result, exposure in the image does not change.

After the process in the step S206, S207, or S210, the camera microcomputer 101 obtains a target luminance for exposure control using the determined photometric mode (step S211). It should be noted that the target luminance is not updated during AE lock.

The camera microcomputer 101 determines TV, AV, and ISO sensitivity which are exposure control values according to the target luminance (step S212). It should be noted that during AE lock, the exposure control values are not updated. The camera microcomputer 101 then ends exposure control, and the process proceeds to the step S105.

Figure 6:
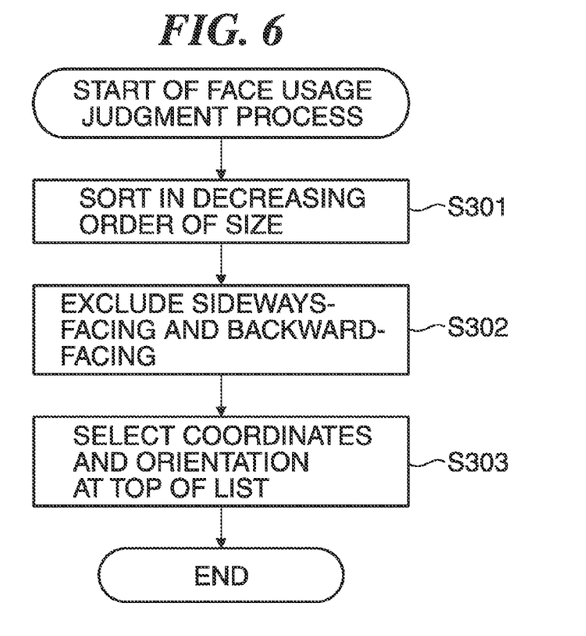
FIG. 6 is a flowchart for use in explaining a face usage judgment process in FIG. 5.

FIG. 6 is a flowchart for use in explaining the face usage judgment process in FIG. 5.

When the face usage judgment process is started, the camera microcomputer 101 detects face regions in image data based on characteristics points of a person's face using the face detection circuit 116 to obtain a face region detection result. The, based on the face region detection result, the camera microcomputer 101 assigns identification numbers (IDs) to the respective face regions, lists their sizes, orientations, and positions (coordinates), and store them as a face list.

Figure 7A:
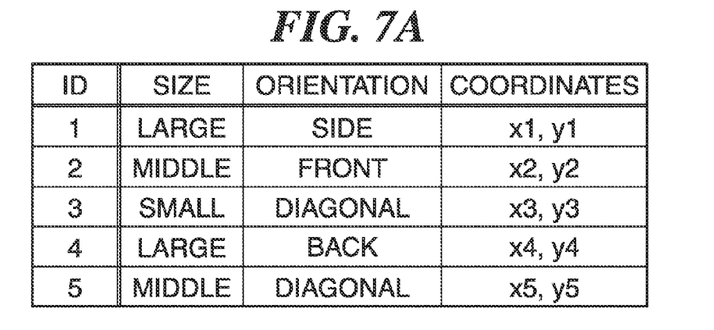
FIG. 7A is a view showing an exemplary face list.
Figure 7B:
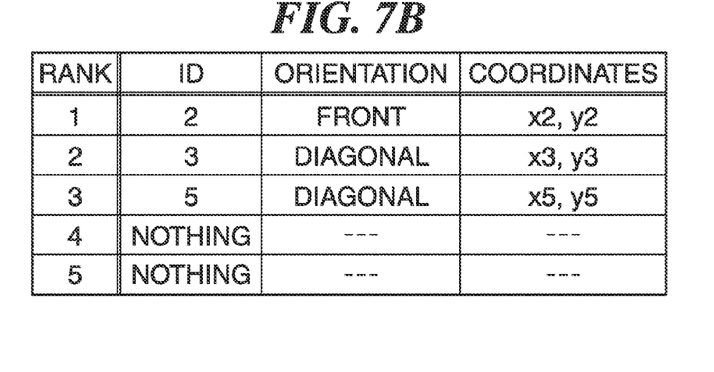
FIG. 7B is a view showing the face list after sorting.

FIGS. 7B and 7b are views useful in explaining a face list stored in the camera microcomputer 101 in FIGS. 1A and 1B. FIG. 7A is a view showing an exemplary face list, and FIG. 7B is a view showing the face list after sorting.

As shown in FIG. 7A, IDs are assigned to face regions detected in image data, and for each of the face regions, its size and orientation as well as coordinates indicative of a center position of a face region in an image are defined.

The camera microcomputer 101 sorts the face regions in decreasing order of face sizes in the face list in FIG. 7A (step S301). The camera microcomputer 101 finds orientations of the face regions and excludes those other than face regions turned front or diagonally. Namely, here, the camera microcomputer 101 excludes face regions turned sideways and backward (step S302).

It should be noted that the camera microcomputer 101 excludes face regions whose orientations do not fall within a range from a frontal direction to 45° to the right and left. Thus, by excluding face regions sideways and backward, exposure control is prevented from being influenced by, for example, the color of hair during exposure control.

As a result of thus sorting the face list in FIG. 7A, for example, a sorted face list in FIG. 7B is obtained. In the sorted face list, IDs, orientations, and coordinates are associated with ranks. It should be noted that in FIG. 7B, face regions with the word "Nothing" inserted in the ID column are excluded face regions.

Then, based on selecting conditions, the camera microcomputer 101 selects a face region with the highest priority (selected detection result) from the sorted face list. Namely, the camera microcomputer 101 outputs orientations and coordinates relating to a face region with the highest priority (face usage judgment result) in the sorted face list (step S303) and terminates the face usage judgment process. The process then proceeds to the step S203 in FIG. 5.

In exposure control, a face region with the coordinates output in the step S303 is used. It should be noted that although face regions whose orientations fall within a range from a frontal direction to 45° to the right and left are used, face usage judgment results may not be stable depending on the state of a subject if an error is taken into account. Thus, the instability removal process is carried out as described below.

Figure 8:
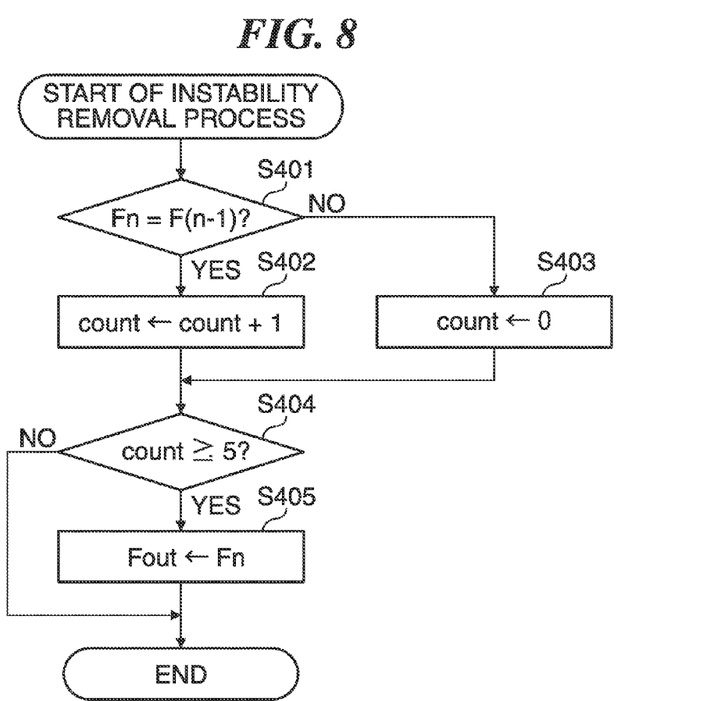
FIG. 8 is a flowchart for use in explaining instability removal process in FIG. 5.

FIG. 8 is a flowchart useful in explaining the instability removal process in FIG. 5. It should be noted that when a plurality of face regions have been detected, the instability removal process is carried out for each of the face regions.

When the instability removal process is started, the camera microcomputer 101 compares a face usage judgment result Fn obtained this time with a face usage judgment result F (n−1) obtained last time and judges whether or not they are the same (step S401). When Fn=F (n−1) holds (YES in the step S401), the camera microcomputer 101 adds one to a variable Count, which is a counter for repeat count judgment (step S402). On the other hand, when Fn=F (n−1) does not hold (NO in the step S401), the camera microcomputer 101 clears the variable Count to zero (step S403).

After the process in the step S402 or S403, the camera microcomputer 101 judges whether or not the variable Count is equal to or a predetermine count value, for example, five (step S404). When the variable Count is equal to or greater than five (YES in the step S404), the camera microcomputer 101 uses the latest face usage judgment result Fn as an instability removal result Fout for a face usage judgment result (step S405). The camera microcomputer 101 then terminates the instability removal process, and the process proceeds to the process in the step S205 in FIG. 5.

On the other hand, when the variable Count is smaller than five (NO in the step S404), the camera microcomputer 101 terminates the instability removal process, and the process proceeds to the step S205 in FIG. 5.

Figure 9:
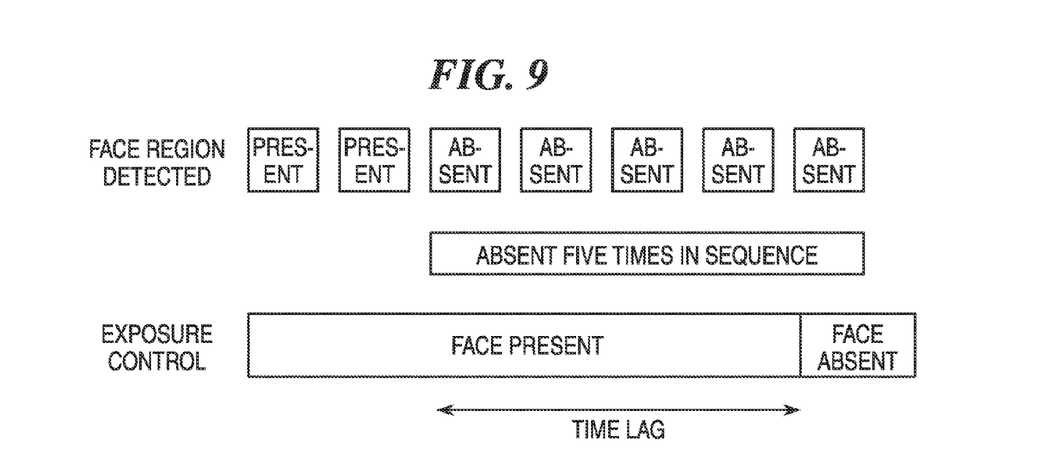
FIG. 9 is a flowchart for use in explaining effects obtained by the instability removal process in FIG. 8.

FIG. 9 is a view useful in explaining an instability removing operation which is performed in the camera in FIG. 3.

Assume now that after a face region is detected twice in sequence, no face region is detected five times in sequence. In this case, the camera determines that as for a face region for use in exposure control, there is no face region when no face region is detected four times in sequence. Namely, after referring to face region detection results a plurality of times, the camera switches face regions for use in exposure control. As a result, exposure in an image does not sensitively respond to instability of face region detection results.

On the other hand, when a face of a person is masked by an object cutting across in front of the person, coordinates of the masked person's face are used in exposure control for a while. For this reason, when a face region for use in exposure control has disappeared as described earlier, the instability removal process in the step S204 in FIG. 5 is not carried out.

As a result, when there is another face region to which exposure control is to be shifted when an object has cut across in front of a person's face, exposure control using this face region is immediately performed. When there is no other face region, exposure is fixed (AE lock) for a predetermined time period, and after the person's face region is unmasked, proper correct exposure control is restored.

As described above, in the embodiment of the present invention, when a new face region appears during exposure control, the instability removal process is carried out, and when a face region that has been used for exposure control disappears, another face region is used for exposure control without carrying out the instability removal process. As a result, exposure in an image is prevented from being influenced by false detection of face regions or instability of face region detection results near the limit to the detection capability.

Further, in the embodiment of the present invention, when a face region that has been used for exposure control disappears, and there is no other face region, exposure is fixed for a predetermined time period without carrying out the instability removal process. As a result, exposure in an image is prevented from being influenced by false detection of face regions or instability of face region detection results near the limit to the detection capability. Further, exposure is prevented from being influenced by an object that has cut across in front of a person.

As is clear from the above description, in the example shown in FIG. 3, the camera microcomputer 101 and the face detection circuit 116 act as a detection unit, and the camera microcomputer 101 acts as a selection unit, a first judgment unit, a second judgment unit, and a recording unit. Further, the camera microcomputer 101 and the lens microcomputer 201 act as a control unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-002922, filed Jan. 9, 2015, which is hereby incorporated by reference herein in its entirety.

What is claimed is:

1. An exposure control apparatus that controls exposure in taking an image of a subject, comprising:
at least one processor connected to a memory, the at least one processor configured to:
obtain detection results by detecting at least one specific region, which is predetermined in advance, in the taken image of the subject;
select, when the at least one specific region is detected one of the detection results based on selecting conditions determined in advance to obtain a selected detection result;
control, when there is the selected detection result, exposure in accordance with a first photometric mode selected in advance;
judge whether exposure is being controlled using the selected detection result; and
judge, when it is judged that exposure is not being controlled using the selected detection result, whether the selected detection result has changed in a predetermined period,
wherein when it is judged that the selected detection result has not changed, a latest obtained detection result regarded as the selected detection result, and when it is judged that the selected detection result has changed, the selected detection result is not changed, and
wherein in a case where the specific region is not detected in a state in which exposure control is being performed using an exposure value based on the selected detection result, exposure is controlled so that the exposure value is maintained until a predetermined period has elapsed.

2. The exposure control apparatus according to claim 1, wherein when there is not the selected detection result for use in the exposure control, exposure is controlled in accordance with a second photometric mode different from the first photometric mode.

3. The exposure control apparatus according to claim 2, wherein the first photometric mode is a mode in which the image is divided into a plurality of areas, and photometry is performed for each of the areas to determine exposure, and the second photometric mode is a mode in which exposure is determined by performing photometry with a weight put on a central part of the image.

4. The exposure control apparatus according to claim 1, wherein the specific region is a face region of a person, and using the selecting conditions, the face region, an orientation of which falls outside a predetermined range, is excluded and the face region with the greatest size is selected as the selected detection result.

5. The exposure control apparatus according to claim 1, wherein in a case where a new specific region is detected before the predetermined period has elapsed, the new specific region is selected as a new selected detection result, and
wherein in a case where the new specific region is selected as the new selected detection result which has been detected before the predetermined period has elapsed, said exposure is controlled using the new selected detection result after the predetermined period has elapsed.

6. An image pickup apparatus comprising:
an image pickup configured to take an image of a subject;
an exposure controller; and
a recorder configured to record the image taken by said image pickup ,
wherein said exposure controller controls exposure in the taking of the image of a subject, the exposure controller comprising:
at least one processor connected to a memory, the at least one processor configured to:
obtain detection results by detecting at least one specific region, which is predetermined in advance, in the taken image of the subject;
select, when the at least one specific region is detected one of the detection results based on selecting conditions determined in advance to obtain a selected detection result;
control, when there is the selected detection result, exposure in accordance with a first photometric mode selected in advance;
judge whether exposure is being controlled using the selected detection result; and
judge, when it is judged that exposure is not being controlled using the selected detection result, whether the selected detection result has changed in a predetermined period,
wherein when it is judged that the selected detection result has not changed, a latest detection result is regarded as the selected detection result, and when it is judged that the selected detection result has changed, the selected detection result is not changed, and
wherein in a case where the specific region is not detected in a state in which exposure control is being performed using an exposure value based on the selected detection result, exposure is controlled so that the exposure value is maintained until a predetermined period has elapsed.

7. A control method for an exposure control apparatus that controls exposure in taking an image of a subject, comprising:
a detection step of obtaining detection results by detecting at least one specific region, which is predetermined in advance, in the taken image of the subject;
a selection step of, when the at least one specific region is detected in said detection step, selecting one of the detection results based on selecting conditions determined in advance to obtain a selected detection result;
a control step of controlling, when there is the selected detection result, exposure in accordance with a first photometric mode selected in advance;
a first judgment step of judging whether exposure is being controlled using the selected detection result; and
a second judgment step of, when it is judged in said first judgment step that exposure is not being controlled using the selected detection result, judging whether the selected detection result has changed in a predetermined period,
wherein when it is judged in said second judgment step that the selected detection result has not changed, a latest detection result obtained in said detection step is regarded as the selected detection result in said selection step, and when it is judged in said second judgment step that the selected detection result has changed, the selected detection result is not changed in said selection step, and wherein in a case where the specific region is not detected in a state in which exposure control is being performed using an exposure value based on the selected detection result, exposure is controlled so that the exposure value is maintained until a predetermined period has elapsed.

8. A non-transitory computer-readable storage medium storing a program for causing a computer to execute a control method for an exposure control apparatus that controls exposure in taking an image of a subject, the control method comprising:
a detection step of obtaining detection results by detecting at least one specific region, which is predetermined in advance, in the taken image of the subject;
a selection step of, when the at least one specific region is detected in said detection step, selecting one of the detection results based on selecting conditions determined in advance to obtain a selected detection result;
a control step of controlling, when there is the selected detection result, exposure in accordance with a first photometric mode selected in advance;
a first judgment step of judging whether exposure is being controlled using the selected detection result; and
a second judgment step of, when it is judged in said first judgment step that exposure is not being controlled using the selected detection result, judging whether the selected detection result has changed in a predetermined period,
wherein when it is judged in said second judgment step that the selected detection result has not changed, a latest detection result obtained in said detection step is regarded as the selected detection result in said selection step, and when it is judged in said second judgment step that the selected detection result has changed, the selected detection result is not changed in said selection step, and
wherein in a case where the specific region is not detected in a state in which exposure control is being performed using an exposure value based on the selected detection result, exposure is controlled so that the exposure value is maintained until a predetermined period has elapsed.

9. An exposure controller comprising:
at least one processor connected to a memory, the at least one processor configured to:
detect a face region in image data;
set a photometric region; and
control exposure when a subject is photographed based on the set photometric region,
wherein in a case where a first face region is detected in the image data at a first timing, exposure is controlled based on a first photometric region which is set based on the first face region,
wherein in a case where the first face region is detected in the image data at the first timing, and the first face region is not detected at a second timing later than the first timing, exposure is maintained based on the first photometric region for a predetermined period and exposure is controlled based on a second photometric region which is set based on a predetermined region in the image data after the predetermined period has elapsed, and
wherein in a case where a second face region is newly detected during the predetermined period when the first face region is detected in the image data at the first timing, and the first face region is not detected at the second timing later than the first timing, exposure is controlled based on a third photometric region which is set based on the second face region after the predetermined period has elapsed.

10. The exposure controller according to claim 9,
wherein the predetermined region is a predetermined part of a screen corresponding to the image data, the predetermined region not depending on the first face region,
wherein in a case where the first face region is detected at the first timing, exposure is controlled based on a first photometric result by performing photometry with a weight put on the first face region in the image data, and
wherein in a case where the first face region is not detected at the second timing, exposure is controlled based on a second photometric result by performing photometry with a weight put on the predetermined region in the image data after the predetermined period has elapsed.

11. The exposure controller according to claim 9, wherein in a case where the first face region is not detected at the first timing, exposure is controlled based on the second photometric region.

12. The exposure controller according to claim 9, wherein in a case where a plurality of face regions are existed in the image data, the first face region is detected based on a predetermined condition set in advance.

13. A control method for an exposure controller, comprising:
a detection step of detecting a face region in image data;
a setting step of setting a photometric region; and
a control step of controlling exposure when a subject is photographed based on the set photometric region,
wherein in a case where a first face region is detected in the image data at a first timing, exposure is controlled based on a first photometric region which is set based on the first face region,
wherein in a case where the first face region is detected in the image data at the first timing, and the first face region is not detected at a second timing later than the first timing, exposure is maintained based on the first photometric region for a predetermined period and exposure is controlled based on a second photometric region which is set based on a predetermined region in the image data after the predetermined period has elapsed, and
wherein in a case where a second face region is newly detected during the predetermined period when the first face region is detected in the image data at the first timing, and the first face region is not detected at the second timing later than the first timing, exposure is controlled based on a third photometric region which is set based on the second face region after the predetermined period has elapsed.

14. A non-transitory computer-readable storage medium storing a program for causing a computer to execute a control method for an exposure controller, the control method comprising:
a detection step of detecting a face region in image data;
a setting step of setting a photometric region; and
a control step of controlling exposure when a subject is photographed based on the set photometric region,
wherein in a case where a first face region is detected in the image data at a first timing, exposure is controlled based on a first photometric region which is set based on the first face region,
wherein in a case where the first face region is detected in the image data at the first timing, and the first face region is not detected at a second timing later than the first timing, exposure is maintained based on the first photometric region for a predetermined period and exposure is controlled based on a second photometric region which is set based on a predetermined region in the image data after the predetermined period has elapsed, and wherein in a case where a second face region is newly detected during the predetermined period when the first face region is detected in the image data at the first timing, and the first face region is not detected at the second timing later than the first timing, exposure is controlled based on a third photometric region which is set based on the second face region after the predetermined period has elapsed.

* * * * *